(12) United States Patent
Mushenski et al.

(10) Patent No.: US 8,051,806 B2
(45) Date of Patent: Nov. 8, 2011

(54) ANIMAL BEHAVIORAL CONTROL APPARATUS

(75) Inventors: Christopher B. Mushenski, Mt. Clemens, MI (US); Vladislav Roytapel, Newport Coast, CA (US)

(73) Assignee: Canine Innovations, Inc., Mount Clemens, MI (US)

( * ) Notice: Subject to any disclaimer, the term of this patent is extended or adjusted under 35 U.S.C. 154(b) by 0 days.

(21) Appl. No.: 12/900,156

(22) Filed: Oct. 7, 2010

(65) Prior Publication Data

US 2011/0017149 A1    Jan. 27, 2011

Related U.S. Application Data

(63) Continuation-in-part of application No. 12/416,614, filed on Apr. 1, 2009.

(60) Provisional application No. 61/041,957, filed on Apr. 3, 2008.

(51) Int. Cl.
*A01K 15/00* (2006.01)
(52) U.S. Cl. ........................ 119/719; 116/139
(58) Field of Classification Search .............. 119/712, 119/719; 116/139, 142 FP, 137 R
See application file for complete search history.

(56) References Cited

U.S. PATENT DOCUMENTS

| | | | |
|---|---|---|---|
| 2,778,330 A * | 1/1957 | Jacoby | 116/106 |
| RE24,730 E * | 10/1959 | Reeves | 116/112 |
| 3,000,344 A * | 9/1961 | Ferrell | 116/112 |
| 3,670,690 A | 6/1972 | Swanson | |
| 4,044,712 A | 8/1977 | Goodman et al. | |
| 4,166,428 A | 9/1979 | Freeman et al. | |
| 4,185,670 A | 1/1980 | Sartell, Jr. | |
| 4,227,482 A | 10/1980 | Scheindel | |
| 4,627,385 A | 12/1986 | Vinci | |
| 4,852,510 A | 8/1989 | Joseph, Jr. et al. | |
| 4,893,580 A | 1/1990 | Joseph, Jr. et al. | |
| 4,915,054 A * | 4/1990 | Vidovic et al. | 116/142 FP |
| 4,967,684 A * | 11/1990 | Vidovic et al. | 116/142 FP |
| 4,970,983 A * | 11/1990 | LeBlanc et al. | 116/142 FP |
| 5,355,830 A * | 10/1994 | deJong | 116/142 FP |
| 5,501,179 A | 3/1996 | Cory | |
| 6,615,770 B2 | 9/2003 | Patterson et al. | |
| 6,820,571 B2 | 11/2004 | Cory | |
| 7,174,856 B2 | 2/2007 | Neri | |
| 7,445,537 B2 * | 11/2008 | Langenfeld | 446/213 |

FOREIGN PATENT DOCUMENTS

WO    2005/051076 A1    6/2005

* cited by examiner

*Primary Examiner* — Rob Swiatek
*Assistant Examiner* — Kristen Hayes
(74) *Attorney, Agent, or Firm* — Reising Ethington P.C.

(57) ABSTRACT

An animal behavioral control apparatus includes a cartridge, a housing, a head, and an extension assembly. The cartridge contains pressurized gas. The housing surrounds a part or more of the cartridge. The head is connected to the housing and includes an actuator and a valve. The valve engages the cartridge when the actuator is actuated in order to release gas out of the cartridge. The extension assembly is connected to the head to receive gas from the head. Upon actuation of the head, gas flows through the extension assembly and the animal behavioral control apparatus ejects a blast of gas which can be directed at an animal.

5 Claims, 4 Drawing Sheets

ANIMAL BEHAVIORAL CONTROL APPARATUS

CROSS-REFERENCE TO RELATED APPLICATIONS

This application claims the benefit, and is a continuation-in-part, of U.S. application Ser. No. 12/416,614 filed Apr. 1, 2009, which claims the benefit of U.S. Provisional application No. 61/041,957 filed Apr. 3, 2008.

FIELD OF THE DISCLOSURE

The present invention relates generally to controlling an animal, and more particularly to using an apparatus to control an animal's behavior.

BACKGROUND OF THE DISCLOSURE

A variety of techniques can be used to control an animal's behavior. For example, dog trainers ordinarily teach dogs by a repetition and reward technique to, among other things, be domesticated, obey commands, compete in shows or races, work in law enforcement, protect property, perform tricks, and guide people who are visually impaired. But sometimes it may be necessary to interrupt undesirable behavior as it is occurring in order to correct it, and sometimes one technique may work on one animal and not work on another animal.

SUMMARY

According to one embodiment, there is provided an animal behavioral control apparatus. The animal behavioral control apparatus may include a cartridge, a housing, a head, and an extension assembly. The cartridge may contain a pressurized gas. The housing may surround a part or more of the cartridge. The head may be connected to the housing, and may include an actuator and a valve. The valve may engage the cartridge when actuated, which may cause the release of gas out of the cartridge and through an outlet port of the head. The extension assembly may be connected to the head in order to receive gas flow from the outlet port. The extension assembly may include a body, a flow restrictor, and a spring. During use of the animal behavioral control apparatus, the spring may bias the flow restrictor in a seated position where a bore of the body is closed. When the head is actuated, the released gas may cause the flow restrictor to move to an unseated position where the bore is opened. Gas may then flow through the extension assembly and the animal behavioral control apparatus may eject a blast of gas out of the extension assembly.

BRIEF DESCRIPTION OF THE DRAWINGS

The following detailed description of preferred embodiments and best mode will be set forth with reference to the accompanying drawings, in which.

DETAILED DESCRIPTION OF ILLUSTRATED EMBODIMENTS

Referring in more detail to the drawings, the figures show exemplary embodiments of an animal behavioral control apparatus 10, 110 that may be used to control an animal's behavior, such as to interrupt a dog's undesirable behavior during training and other activities. The animal behavioral control apparatus 10, 110 is a single device that can optionally, and mutually exclusively in some cases, eject a blast of gas that may be objectionable to the dog or emit a sound that may be objectionable to the dog. Though not all animals may find a particular blast of gas or sound objectionable, the blast of gas or sound may, in some cases, at least distract or be noticeable by the animal.

Figure 1:
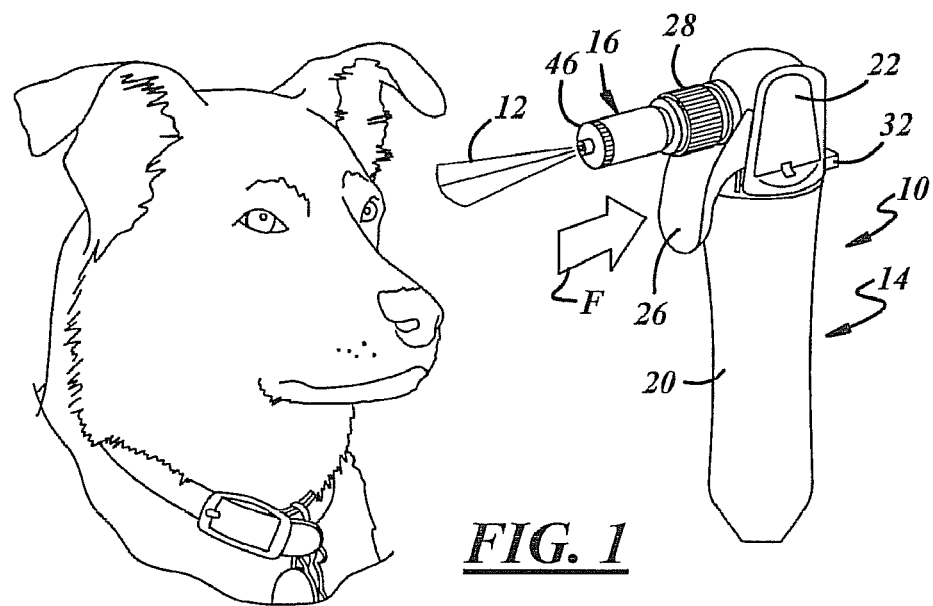
FIG. 1 is a schematic showing one exemplary embodiment of an animal behavioral control apparatus ejecting a blast of gas at an animal.
Figure 2:
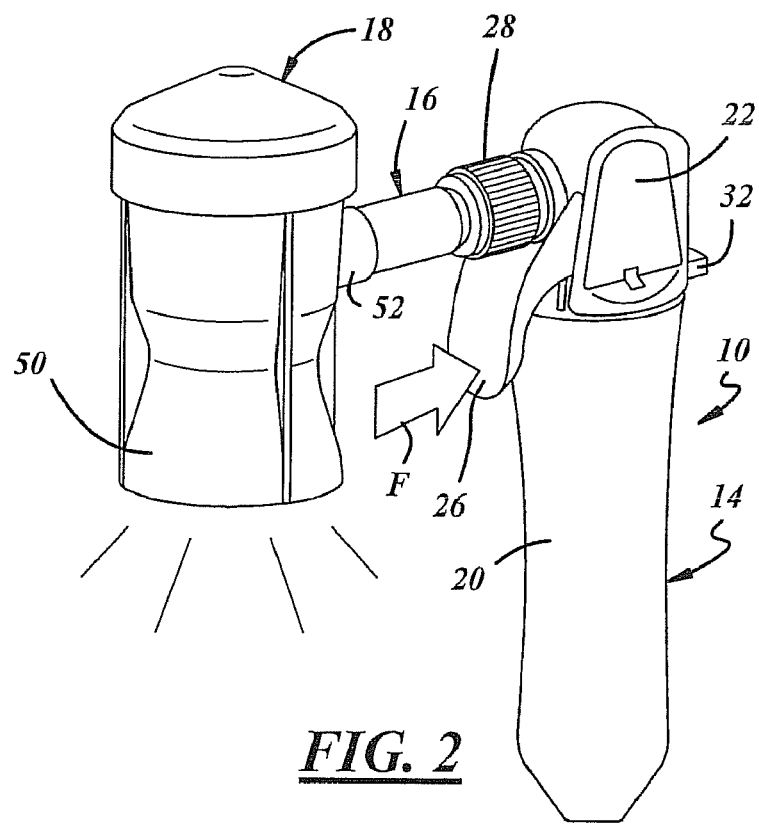
FIG. 2 is a schematic showing the animal behavioral control apparatus of FIG. 1 emitting a sound.
Figure 3:
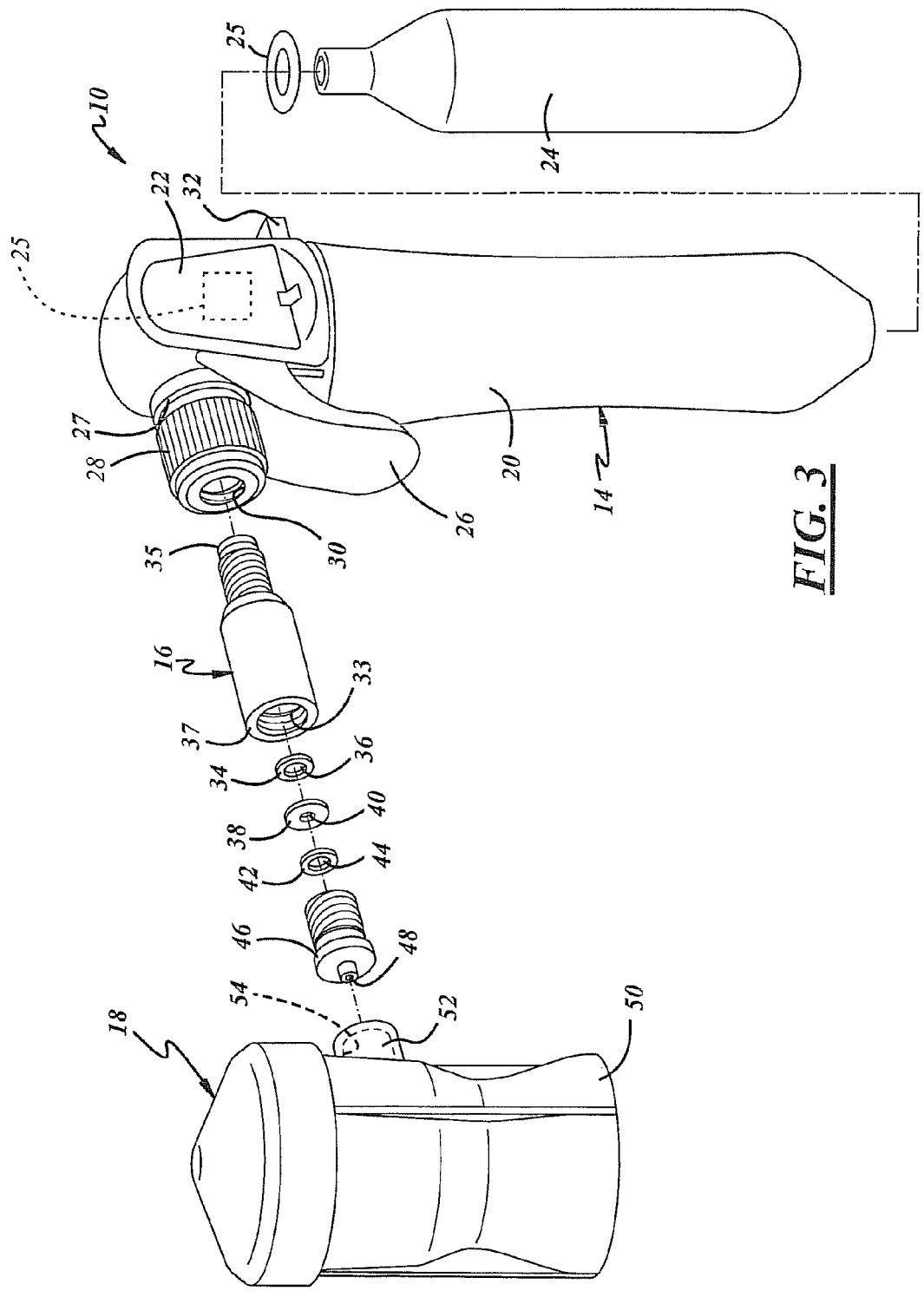
FIG. 3 is an exploded view of the animal behavioral control apparatus of FIG. 2.

Referring to the exemplary embodiment of FIGS. 1-3, the animal behavioral control apparatus 10 can eject a blast or shot of gas in a somewhat controlled and directed zone 12 which, when aimed at the dog, may be disagreeable to the dog and may disrupt whatever the dog is doing at the time. Alternatively, the animal behavioral control apparatus 10 can give-off a sound that may be disagreeable to the dog and may also interfere with whatever the dog is doing at the time. Referring to FIGS. 1-3, one embodiment of the animal behavioral control apparatus 10 may include a gas discharge device 14 that ejects gas, an extension 16 connected to the gas discharge device, and a horn 18 connected to the extension.

The gas discharge device 14 ejects a blast of gas when a user actuates it. Depending on the arrangement of the animal behavioral control apparatus 10, the blast of gas may result in the zone of gas 12 or in the sound; in some cases, the blast of gas may result in both the zone of gas and the sound which may both be disagreeable to the dog. The gas discharge device 14 may be a compact hand-held device and may include a housing 20 with a head 22. The housing 20 is constructed to receive and support a pressurized gas cartridge cylinder, such as a cartridge 24. The cartridge 24 may contain pressurized gas such as $CO_2$, $N_2$, $O_2$, NO, or the like. In one example, the cartridge 24 may be a 16 gram non-threaded or threaded reservoir. In other examples, the cartridge 24 may be a 25 or 38 gram threaded reservoir, or a 40-43 gram threaded reservoir. In one embodiment, an O-ring 25 may be located between the housing 20 and the head 22 to facilitate fitting between the two. The O-ring 25 may have an X-shaped cross-section and may be made of rubber. Though not shown, the housing 20 may have an open bottom with a bottom of the cartridge 24 extending below the open bottom or being generally flush with the open bottom. Still in other examples, the housing 20 need not be included at all, where only the cartridge 24 is provided and the head 22 is equipped to the cartridge.

The head 22 may be connected to the housing 20 by screwing, may be unitary with the housing, or may be connected in another way. The head 22 may have a regulator or an internal valve 29 that, when operated, releases pressurized gas held in the cartridge 24. An actuator such as a trigger 26 may be operatively connected to the internal valve whereby upon being pushed or pulled by a force F, the valve may insert a piercing pin (not shown) into the cartridge 24 which controllably releases pressurized gas from the cartridge. The head 22 may have an outlet port 27. An attachment or nozzle 28 may extend from one end of the internal valve and may be inserted in the outlet port 27. The nozzle 28 may define an outlet port 30 where the released gas is ejected out of the head 22 and out of the internal valve. In other examples, the nozzle 28 need not necessarily be provided where the extension 16 would be connected directly to the head 22. A safety switch 32 may be operatively connected to the internal valve whereby, upon pressing or pulling, prevents the trigger 26 from being pulled and thus the gas from being released. In one example, the gas discharge device 14 can be an inflator such as the Ultraflate Plus that is sold by Genuine Innovations, Inc. of Tucson, Ariz. USA.

The extension 16 may be connected by press-fitting, screwing, or another way (shown in FIG. 3 with outer threads) into the nozzle 28 to, among other things, control the ejected gas and serve as a fitting for the horn 18. In one example, the extension 16 may be made of metal and may have a length of about 1.0 inches. In another example, the extension 16 may have a length of about 1.5 inches. The extension 16 may define a bore 33 that extends from a first end 35 to a second end 37. In one example, the bore 33 may have a diameter of about $5/16$ inch; of course other lengths and diameters are possible. In the embodiment shown, one or more O-rings and plates may be located and held in the bore 33 and spaced-apart with respect to each other. The one or more O-rings and plates may have different axial lengths, and may define orifices of different diameters. The different orifices may, among other things, restrict or choke gas flow, force the flowing gas to converge therein, and change the velocity and pressure of the gas flow thereat. In some embodiments, the extension 16 need not be provided.

For example, a first O-ring 34 may be made of rubber or cork and may define a first orifice 36 located therein. The first O-ring 34 may provide a seal between its periphery and the inner surface of the bore 33. In one embodiment, the first O-ring 34 may be the only O-ring located in the extension 16, and may be positioned between about $1/4$-$1/2$ inch measured from the second end 37. A plate 38 may be composed of rubber or cork and may define a second orifice 40 therein having a diameter in a range of about $28/1000$ inch to $30/1000$ inch. And a second O-ring 42 may be composed of rubber or cork and may define a third orifice 44 having a diameter that may be greater than the second orifice 40. The first orifice 36 may also have a diameter that may be greater than the second orifice 40. The second O-ring 42 may provide a seal between its periphery and the inner surface of the bore 33. The O-rings 34, 42 may also serve as spacers.

A cap 46 may, though need not, be located at one end of the extension 16 and may define an outlet 48 through which the ejected gas can travel and which may form directed zone 12. In one example, the outlet 48 may have a diameter in a range of about $33/1000$ inch to $77/1000$ inch, and may be about 0.029 inches to 0.031 inches. The cap 46 may be threaded to screw into the extension 16, or otherwise connected to the extension. The exact size of each of the orifices including the first orifice 36, the second orifice 40, the third orifice 44, and the outlet 48 may depend on, among other things, the desired number of individual blasts of gas and the desired intensity of the emitted sound. In other embodiments, the extension 16 may not have the O-rings or the plate, and instead may have a body that itself defines a single bore with varying diameters and with a unitary cap. And in yet other embodiments, the extension 16 may simply not have the O-rings or plate, and may only have the cap 46.

The horn 18 may be removably and optionally press-fit over the second end 37 of the extension 16, and may be used to radiate the resulting sound waves of the ejected gas to produce a sound that may be relatively intense and objectionable to the dog (as compared to a non-radiated and less intense hissing sound of the ejected gas without the horn). The horn 18 may also generate sound waves. The horn 18 may be composed of plastic and may be a one-piece structure that is injection molded. The horn 18 may have a flared bell end 50, and a stem 52 defining a bore 54. The bore 54 may be reamed or otherwise smoothed so that the stem 52 can be press-fit and inserted over the second end 37 of the extension 16 to connect the horn 18 to the extension. In one example, the horn 18 may be the SH3 horn supplied by Falcon Safety Products, Inc. of Branchburg, N.J., USA (www.falconsafety.com).

In use, the animal behavioral control apparatus 10 may optionally and selectively eject a blast of gas at the dog, may emit an objectionable sound at the dog, or may do both. For example, with the horn 18 removed, the trigger 26 may be manually pressed causing the piercing pin of the internal valve to penetrate the cartridge 24 and allow pressurized gas to escape through the head 22, through the nozzle 28, and into the extension 16. The gas travels through the various orifices and the outlet 48 to create a sudden shot of the zone of gas 12. With the horn 18 placed on the extension 16 (if so provided), the ejected gas travels through the horn and produces the objectionable sound. The example cartridge 24 and the various orifices may, in one example, produce 30 blasts of gas, 60 objectionable sounds of one second duration, or a combination thereof Of course, the animal behavioral control apparatus may be used with other animals besides dogs, including outdoor animals and other household pets such as cats.

Figure 4:
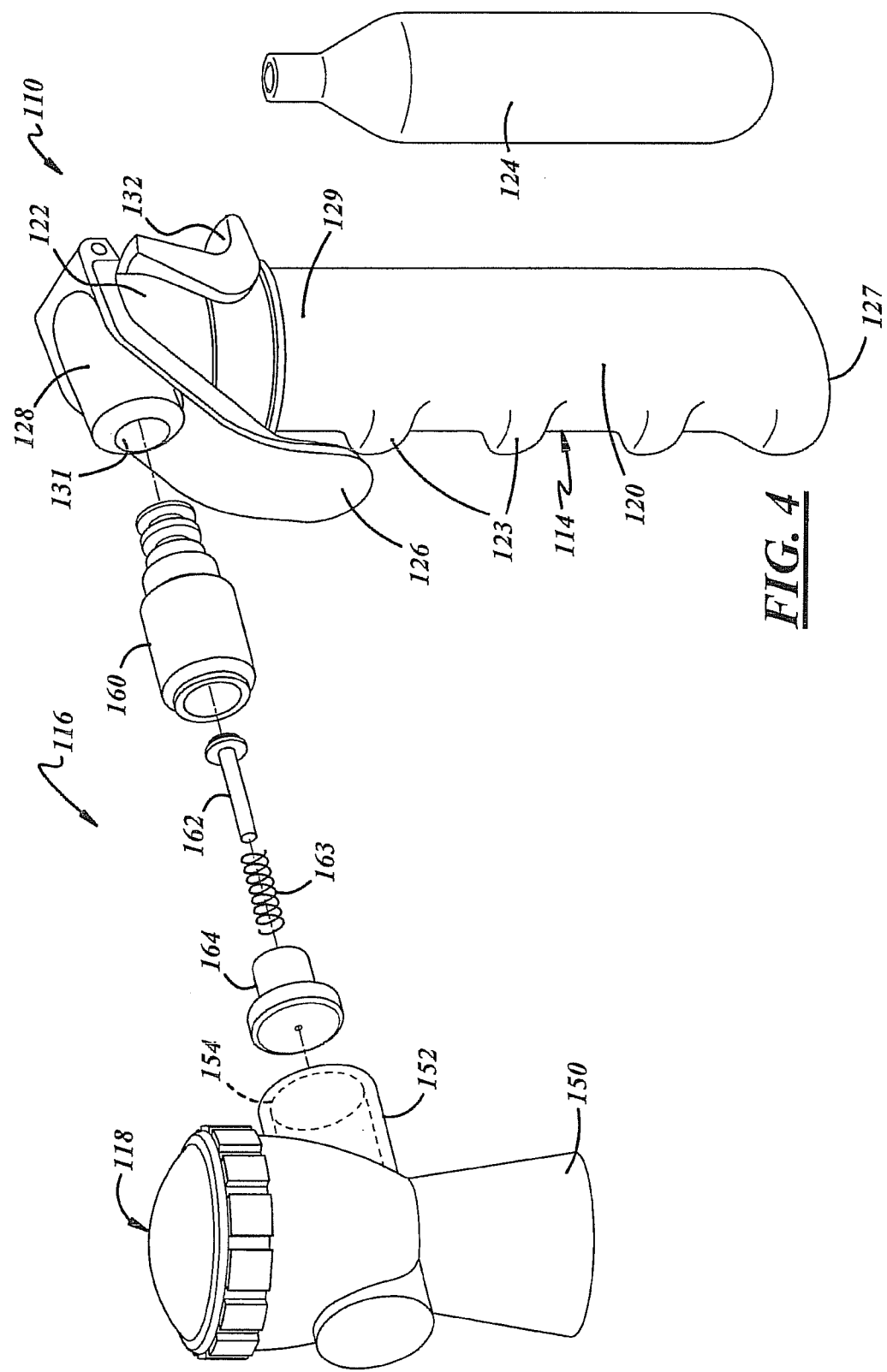
FIG. 4 is an exploded view of another exemplary embodiment of an animal behavioral control apparatus.
Figure 5:
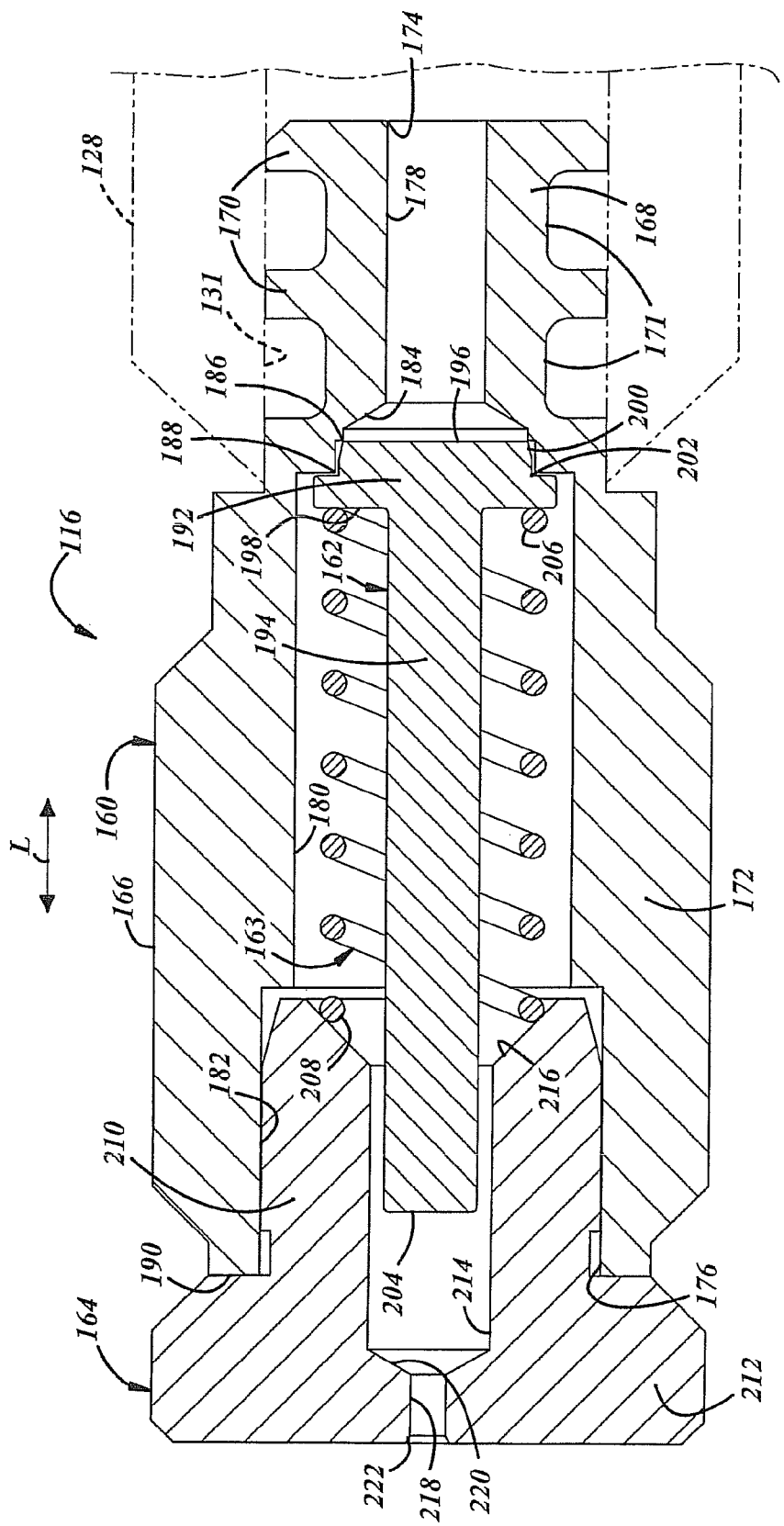
FIG. 5 is a cross-section view of an assembly used with the animal behavioral control apparatus of FIG. 4.

FIGS. 4 and 5 show another exemplary embodiment of an animal behavioral control apparatus 110 that may be similar in some ways to the animal behavioral control apparatus of FIGS. 1-3. The animal behavioral control apparatus 110 can eject a blast or shot of gas in a somewhat controlled or directed zone, and alternatively can emit an objectionable sound. Referring to FIGS. 4 and 5, this embodiment of the animal behavioral control apparatus 110 may include a gas discharge device 114 that ejects gas, an extension assembly 116 connected to the gas discharge device, and a horn 118 connected to the extension assembly.

The gas discharge device 114 ejects a blast of gas when a user actuates it. The blast of gas may result in a zone of gas (similar to that shown in FIG. 1) or may result in the sound; in some cases, the blast of gas may result in both the zone of gas and the sound which may both be disagreeable to the dog. The gas discharge device 114 may be a compact hand-held device and may include a housing 120 and a head 122. The housing 120 may be composed of a vinyl material or another soft material that is suitable for grasping by a user. The housing 120 may include finger grips 123 for a user's hand. In assembly, the housing 120 may be connected to the head 122 by press-fitting, screwing, or via another way.

The housing 120 may be constructed to receive and support a pressurized gas cartridge cylinder, such as a cartridge 124. The cartridge 124 may contain pressurized gas such as $CO_2$, $N_2$, $O_2$, NO, or the like. In one example, the cartridge 124 may be a 16 gram non-threaded or threaded reservoir. In other examples, the cartridge 124 may be a 25 or 38 gram threaded reservoir, or a 40-43 gram threaded reservoir. In one embodiment, an O-ring (not shown) may be located between the housing 120 and the cartridge 124 to facilitate fitting between the two. The housing 120 may have a closed bottom 127 to enclose the cartridge 124 when assembled, and may have an open top 129 to receive the cartridge 124 when assembled.

The head 122 may be connected to the housing 120 by press-fitting, screwing, or may be connected in another way. The head 122 may have a regulator or an internal valve (not shown) that, when operated, releases pressurized gas held in the cartridge 124. An actuator such as a trigger 126 may be operatively connected to the internal valve whereby upon being pushed or pulled by a force exerted by the user, the valve may insert a piercing pin (not shown) or other projection into the cartridge 124 which controllably releases pressurized gas from the cartridge. The head 122 may have an outlet port 131 through which the pressurized gas exits the head. A nozzle 128 may extend from one end of the internal valve and may define the outlet port 131. The nozzle 128 may receive the extension assembly 116 upon assembly. A safety switch 132 may be operatively connected to the internal valve whereby, upon pressing or pulling, the safety switch prevents the trigger 126 from being actuated and thus prevents the gas from being released. In one example, the gas discharge device 114 can be an inflator such as the Ultraflate Plus that is sold by Genuine Innovations, Inc. of Tucson, Ariz. USA (www.genuineinnovations.com).

The extension assembly 116 may be connected by press-fitting, screwing, or via another way (shown in FIG. 4 as press-fit) into the nozzle 128 in order to, among other things, control ejection of the gas and serve as a fitting for the horn 118. In the embodiment of FIGS. 4-5, the extension assembly 116 may include a housing 160, a flow restrictor 162, a spring 163, and a cap 164. In one example, the extension assembly 116 can be a custom part manufactured by Fettes Manufacturing of Sterling Heights, Mich., USA (www.fettesmanufacturing.com).

The housing 160 may be used to connect directly to the nozzle 128 of the head 122, and may be used to carry and support the flow restrictor 162, the spring 163, and the cap 164. The housing 160 may have different arrangements and constructions which may be dictated by, among other things, the arrangements and constructions of the head 122 and the horn 118, and the desired attributes of the resulting ejected gas. Referring to FIG. 5, in this example the housing 160 may have a body 166 that may be composed of a metal material such as an aluminum alloy. The body 166 may have a first portion 168 that is inserted directly into the nozzle 128. Exterior ribs 170 may be located on the first portion 168 in order to facilitate press-fitting into the nozzle 128; O-rings (not shown) may be seated around channels 171 defined between each rib in order to form an air-tight seal thereat. The body 166 may also have a second portion 172 that is not inserted into the nozzle 128, and instead projects out of the nozzle and is exposed thereat.

The body 166 may further have a first open end 174 and a second open end 176. Internally, the body 166 may define a first bore 178, a second bore 180, and a third bore 182. The first bore 178 may communicate directly with the outlet port 131 of the nozzle 128, and may receive ejected gas directly therefrom. In one example, the first bore 178 may have a diameter of about 0.090 inches; of course, diameters of other values are possible. The second bore 180 may be located downstream (with respect to direction of gas flow) of the first bore 178, and may receive a portion of the flow restrictor 162 and the spring 163. The second bore 180 may have a diameter that has a greater value than that of the first bore 178. An intermediate structure may be provided between the first bore 178 and the second bore 180 in order to accommodate a portion of the flow restrictor 162 which is seated thereat, and in order to control the flow of ejected gas. In this embodiment, the intermediate structure may include a tapered section 184, a first step 186, and a second step 188. The third bore 182 may be located downstream of the intermediate structure and downstream of the second bore 180, and may receive a portion of the cap 164. In one example, the third bore 182 may have a diameter that has a greater value than that of the second bore 180, and may have a diameter of about 0.313 inches; of course, diameters of other values are possible. The body 166 may also have a free end surface 190. In one example, the housing can, though need not, be a valve extension part number 22-5-08838-M provided by Victor/Bell Automotive Products, Inc. of Scottsdale, Ariz., USA (www.bellautomotive.net).

The flow restrictor 162 cooperates with the spring 163 during use in order to limit the amount of gas that is ejected out of the extension assembly 116. The flow restrictor 162 may have different arrangements and constructions which may be dictated by, among other things, the arrangements and constructions of the housing 160, and the desired attributes of the resulting ejected gas. Referring to FIG. 5, in this example the flow restrictor 162 may be composed of a metal material such as an aluminum alloy. In one example, the flow restrictor 162 may have a total longitudinal length from free-end-to-free-end of about 0.68 inches; of course, lengths of other values are possible. The flow restrictor 162 may have a head portion 192 and a stem portion 194. The head portion 192 may be radially enlarged as compared to the stem portion 194, and when assembled, the head portion may be seated against the intermediate structure of the body 166. The head portion 192 may have a free end surface 196 and a back end surface 198. The head portion 192 may also have a tapered section 200 and a recess 202. The outer diameter of the head portion 192 may gradually reduce in value toward the free end surface 196 at the tapered section 200, and the recess 202 may complement the construction of the second step 188 and may come into direct abutment with the second step upon assembly. In one example, the head portion 192 may have a longitudinal length (i.e., free end surface 196 to back end surface 198) of about 0.060 inches; of course, lengths of other values are possible. And in one example, the head portion 192 may have an outermost diameter (i.e., outer diameter taken at back end surface 198) of about 0.22 inches; of course, diameters of other values are possible.

The stem portion 194 may extend from the head portion 192 and may cooperate with the spring 163 and the cap 164 to help guide back-and-forth linear movement of the flow restrictor 162 in the longitudinal direction L. The stem portion 194 may be elongated, and may have a free end surface 204. When assembled, as shown in FIG. 5, a portion of the stem portion 194 may be encircled by the spring 163, and a portion which includes the free end surface 204 may be inserted into the cap 164. In one example, the stein portion 194 may have a longitudinal length (i.e., back end surface 198 to free end surface 204) of about 0.62 inches; of course, lengths of other values are possible. And in one example, the stem portion 194 may have an outer diameter of about 0.085 inches; of course, diameters of other values are possible.

The spring 163 may be positioned around the stem portion 194 and is used to bias the flow restrictor 162 in its seated position as shown in FIG. 5. The spring 163 may be a compression coil spring or other biasing component, and may have a spring constant of about 20-22 psi; of course, spring constants of other values are possible. The spring 163 may have a first end 206 urged directly and abuttingly against the head portion 192 at the back end surface 198, and may have a second end 208 urged directly and abuttingly against the cap 164. In assembly, the spring 163 may be located mostly within the second bore 180 of the body 166. In other embodiments not shown, the second end 208 of the spring 163 may be urged directly and abuttingly against a stop extending from the housing 160.

The cap 164 may be located at one end of the housing 160, and gas may be ejected therefrom and out of the extension assembly 116. The cap 164 may have different arrangements and constructions which may be dictated by, among other things, the arrangements and constructions of the housing 160, and the desired attributes of the resulting ejected gas. Referring to FIG. 5, in this example the cap 164 may have a first portion 210 that may be inserted into the third bore 182 and may be press-fit therein upon assembly. The cap 164 may also have a second portion 212 that may be radially enlarged as compared to the first portion 210, and may project out of the housing 160 and may be exposed thereat. In one example, the cap 164 may have a total longitudinal length from free-end-to-free-end of about 0.40 inches; of course, lengths of other values are possible. The cap 164 may further have a first orifice 214 that may receive an end portion of the stem portion 194. The first orifice 214 may communicate upstream with a tapered section 216 (tapered with respect to downstream direction of gas flow). The cap 164 may have a second orifice 218 which may have a diameter that is lesser in value than that of the first orifice 214. In one example, the second orifice 218 may have a diameter of about 0.030 inches; of course, diameters of other values are possible. The second orifice 218 may communicate upstream with a tapered section 220, and may communicate downstream with a tapered section 222 (tapered with respect to upstream direction of gas flow). In other embodiments, the cap 164 need not be provided.

The different bores, tapered sections, and orifices of the extension assembly 116 may, among other things, restrict or choke gas flow, force the flowing gas to converge therein, and change the velocity and pressure of the gas flow thereat.

The horn 118 may be removably and optionally press-fit over the extension assembly 116, and may be used to radiate the resulting sound waves of the ejected gas to produce a sound that may be relatively intense and objectionable to the dog (as compared to a non-radiated and less intense sound of the ejected gas without the horn). The horn 118 may also generate sound waves. The horn 118 may be composed of plastic and may be a one-piece structure that is injection molded. The horn 118 may have a flared bell end 150, and a stem 152 defining a bore 154. The bore 154 may be constructed so that the stem 152 can be press-fit and inserted over the extension assembly 116 to connect the horn 118 to the extension assembly.

In use, the animal behavioral control apparatus 110 may optionally and selectively eject a blast of gas at the dog, may emit an objectionable sound at the dog, or may do both. The animal behavioral control apparatus 110 may function similarly to that already described for the animal behavioral control apparatus 10 of FIGS. 1-3. In the embodiment of FIGS. 4 and 5, the pressurized gas flowing through the extension assembly 116 overcomes the force exerted by the spring 163 and unseats the flow restrictor 162. Once unseated, gas travels through the second bore 180, through the first orifice 214, and out the second orifice 218.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An animal behavioral control apparatus, comprising:
a cartridge containing pressurized gas;
a housing surrounding at least part of the cartridge;
a head connected to the housing, the head including an actuator and a valve, the valve engaging the cartridge upon actuation of the actuator to release gas out of the cartridge and through an outlet port of the head; and
an extension assembly connected to the head to receive gas from the outlet port, the extension assembly including a body, a flow restrictor located at least partly within the body, and a spring located at least partly within the body, wherein, during use, the spring biases the flow restrictor in a seated position to close a bore of the body, and wherein, upon actuation of the head, the released gas causes the flow restrictor to move to an unseated position against the biasing of the spring to open the bore, and gas flows through the extension assembly, and the animal behavioral control apparatus ejects a blast of gas out of the extension assembly, the extension assembly further including a cap located at an end of the body, the cap having an outlet orifice for ejecting the blast of gas, the outlet orifice having a diameter that is less than that of the bore.

2. The animal behavioral control apparatus of claim 1, further comprising a horn removably connected to the extension assembly, wherein, when the horn is connected to the extension assembly and upon actuation of the head, the animal behavioral control apparatus emits a sound.

3. The animal behavioral control apparatus of claim 1, wherein the housing is composed of a vinyl material and has a plurality of finger grips for grasping by a user.

4. The animal behavioral control apparatus of claim 1, wherein the housing has a closed bottom.

5. The animal behavioral control apparatus of claim 1, wherein the actuator is a trigger.

* * * * *